(12) United States Patent
Moss et al.

(10) Patent No.: US 7,334,367 B2
(45) Date of Patent: Feb. 26, 2008

(54) FISHING ROD WITH CASTING MECHANISM

(76) Inventors: Jesse L. Moss, 123 Shaw St., Park Hills, MO (US) 63601; Sherry M. Moss, 123 Shaw St., Park Hills, MO (US) 63601

( * ) Notice: Subject to any disclaimer, the term of this patent is extended or adjusted under 35 U.S.C. 154(b) by 0 days.

(21) Appl. No.: 11/043,347

(22) Filed: Jan. 26, 2005

(65) Prior Publication Data

US 2006/0162230 A1 Jul. 27, 2006

(51) Int. Cl.
*A01K 91/02* (2006.01)

(52) U.S. Cl. .......................................... 43/19
(58) Field of Classification Search ............... 43/19; 124/26, 21
See application file for complete search history.

(56) References Cited

U.S. PATENT DOCUMENTS

| | | | |
|---|---|---|---|
| 2,645,218 A * | 7/1953 | Fisher | 124/21 |
| 2,823,482 A * | 2/1958 | Kremski | 43/19 |
| 2,864,197 A * | 12/1958 | Johnson | 43/19 |
| 2,875,548 A * | 3/1959 | Stewart | 43/19 |
| 2,932,111 A * | 4/1960 | Kremski et al. | 43/19 |
| 3,001,316 A * | 9/1961 | Fefelov | 43/19 |
| 3,365,834 A | 1/1968 | Kreft | |
| 3,416,256 A | 12/1968 | Blocker | |
| 3,656,252 A | 4/1972 | Sherman | |
| 3,717,947 A | 2/1973 | Nomura | |
| 3,962,813 A | 6/1976 | Moon | |
| 4,014,126 A | 3/1977 | Samuels et al. | |
| 4,040,198 A | 8/1977 | Skibo | |
| 5,491,924 A | 2/1996 | Athanasiadis | |
| 5,735,074 A | 4/1998 | Stauffer | |
| 5,926,991 A | 7/1999 | Chesnut | |

* cited by examiner

*Primary Examiner*—Kurt Rowan
(74) *Attorney, Agent, or Firm*—Dale J. Ream (57) ABSTRACT

A fishing rod includes an elongate shaft defining an interior space. A stop, a cocking rod, a firing rod, and an energizing element are mounted in the interior space. The cocking rod may transfer energy to the energizing element. A trigger attached to the cocking rod is selectively movable through an opening in the stop for releasing the energizing element's energy. A trigger release assembly proximate the trigger includes a ball bushing slidably coupled to the cocking rod and a button extending through the elongate shaft. A rod tip is included for selectively retaining an item of fishing tackle attached to a fishing line. Means are included for anchoring and locking the position of the fishing line. In use, energy is transferred to the energizing element and then selectively released to automatically cast the fishing line by swinging the rod in a traditional casting motion or by pushing a button.

15 Claims, 8 Drawing Sheets

FISHING ROD WITH CASTING MECHANISM

BACKGROUND OF THE INVENTION

This invention relates generally to a fishing rod. In particular, the present invention relates to a fishing rod with a mechanism for casting bait.

Fishing rods have long been used with fishing line to catch fish. Traditionally, the line is attached to the rod and cast into the water manually. Many people, and especially the young and disabled, are simply unable to manually cast fishing line due to strength and coordination issues. Nevertheless, many of these people still want to swing a fishing rod in somewhat of a traditional casting motion when casting. Further, it is extremely difficult for the vast majority of people to accurately cast fishing line to a desired location.

Various proposals for fishing poles with line throwing ability are found in the art. U.S. Pat. Nos. 3,365,834, 3,416,256, 3,656,252, 3,717,947, 3,962,813, 4,040,198, 5,491,924, 5,735,074, and 5,926,991 disclose fishing poles with casting mechanisms. While assumably effective for their intended purposes, the existing devices do not provide a fishing rod that casts automatically when the rod is swung in a traditional casting motion and that casts at the push of a button. Therefore, it would be desirable to have a fishing rod having these features.

SUMMARY OF THE INVENTION

A fishing rod according to the present invention includes an elongate shaft defining an interior space. A stop, a cocking rod, a firing rod, and an energizing element are mounted in the elongate shaft interior space. The cocking rod is in communication with the energizing element for selectively transferring energy to the energizing element. A trigger is attached to the cocking rod and is selectively movable through an opening in the stop for releasing the energy stored in the energizing element. A trigger release assembly is proximate the trigger for altering the trigger's configuration to allow the trigger to be moved through the stop opening. The trigger release assembly includes a ball bushing slidably coupled to the cocking rod for altering the trigger's configuration when a casting motion is imparted to the elongate shaft and a button extending through the elongate shaft for selectively exerting force on the trigger to alter the trigger's configuration. A rod tip is included for selectively retaining an item of fishing tackle attached to a fishing line. Means are included for anchoring and locking the position of the fishing line. In use, energy is transferred to the energizing element and then selectively released to automatically cast the fishing line by swinging the rod in a traditional casting motion or, alternatively, by pushing a button.

Therefore, a general object of this invention is to provide a fishing rod that casts automatically when swung in a traditional casting motion.

Another object of this invention is to provide a fishing rod, as aforesaid, that casts at the push of a button.

Still another object of this invention is to provide a fishing rod, as aforesaid, that is safe to use.

Yet another object of this invention is to provide a fishing rod, as aforesaid, that is durable.

A further object of this invention is to provide a fishing rod, as aforesaid, that is lightweight.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 1a is a top view of a fishing rod according to the present invention;

FIG. 1b is a sectional view of the fishing rod taken along line 1b-1b of FIG. 1a;

FIG. 1c is side view of the fishing rod as in FIG. 1a;

FIG. 1d is a sectional view of the fishing rod taken along line 1d-1d of FIG. 1c;

FIG. 5a is a sectional view on an enlarged scale as in FIG. 4a;

DESCRIPTION OF THE PREFERRED EMBODIMENT

A fishing rod with release mechanism according to the present invention will now be described in detail with reference to FIGS. 1a through 8b of the accompanying drawings. More particularly, a fishing rod with release mechanism ("fishing rod") 100 includes an elongate shaft 110 defining an interior space 112 and having opposed first and second ends 114, 115 (FIGS. 1a through 1d). A stop 120 is mounted in the elongate shaft interior space and defines a stop opening 122 (FIGS. 4a through 5b). A cocking rod 130 is slidably mounted in the elongate shaft interior space 112 so that it may selectively travel through the stop opening 122 (FIGS. 4a through 5b).

Figures 4A, 4B:
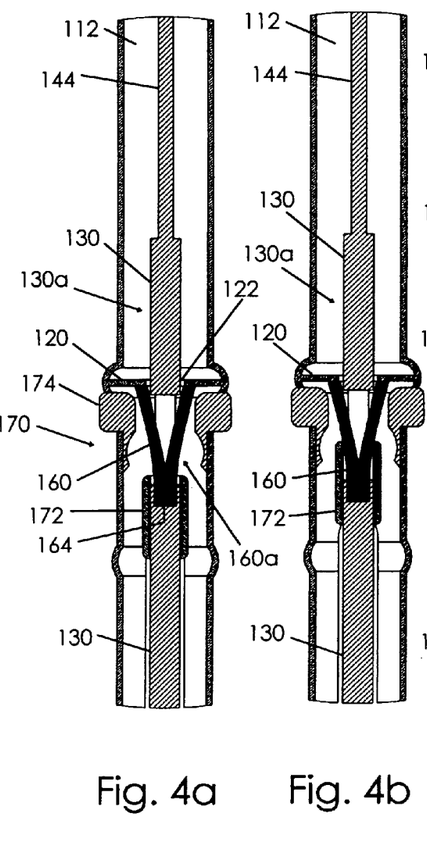
FIG. 4a is a sectional view on an enlarged scale taken from FIG. 1d with a trigger at a first configuration.
FIG. 4b is a sectional view on an enlarged scale as in FIG. 4a with a ball bushing moving along the trigger.
Figures 6A, 6B:
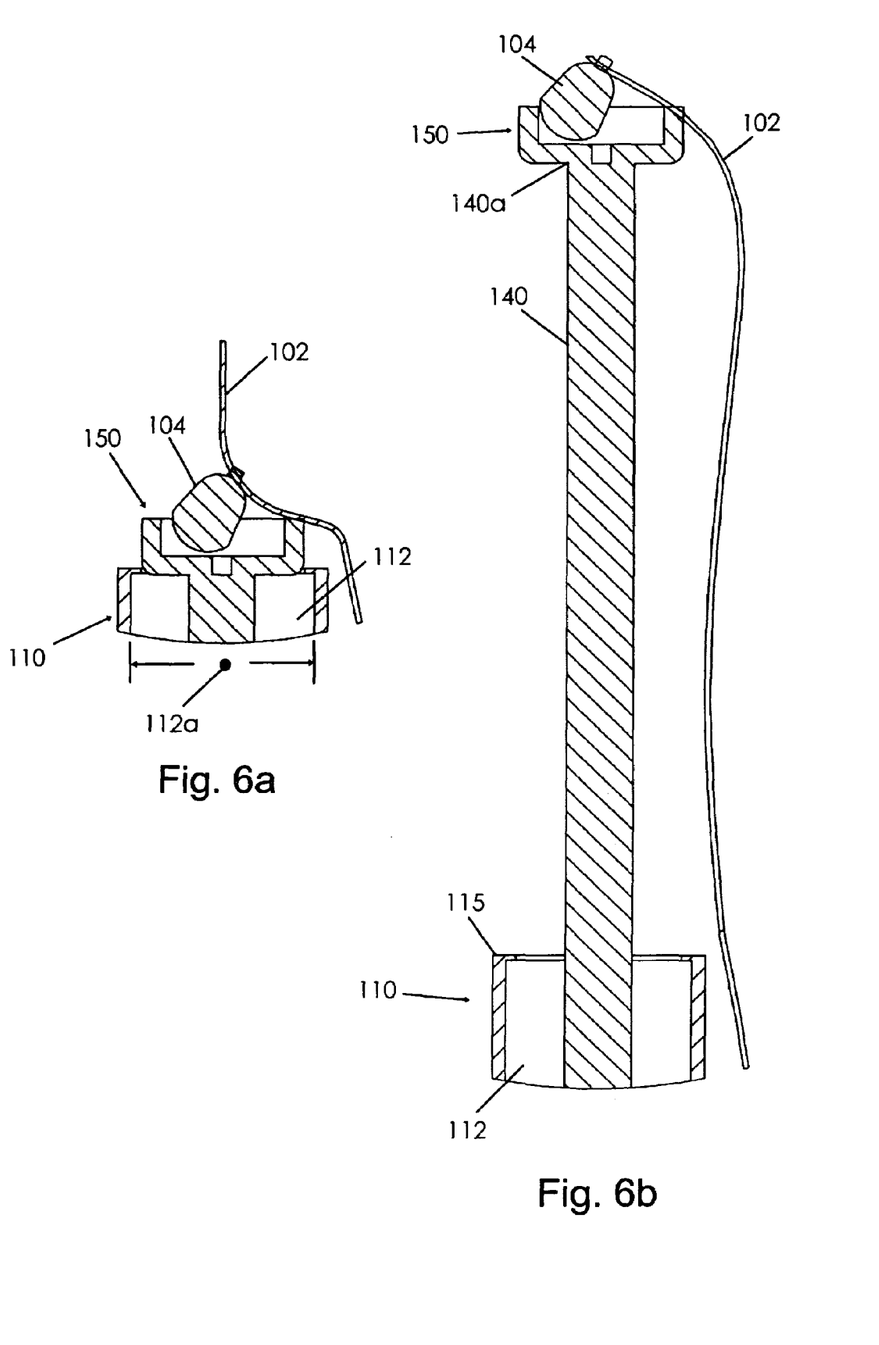
FIG. 6a is a sectional view on an enlarged scale taken from FIG. 1b.
FIG. 6b is a sectional view on an enlarged scale as in FIG. 6a with a firing rod extended outwardly.
Figures 7A, 7B:
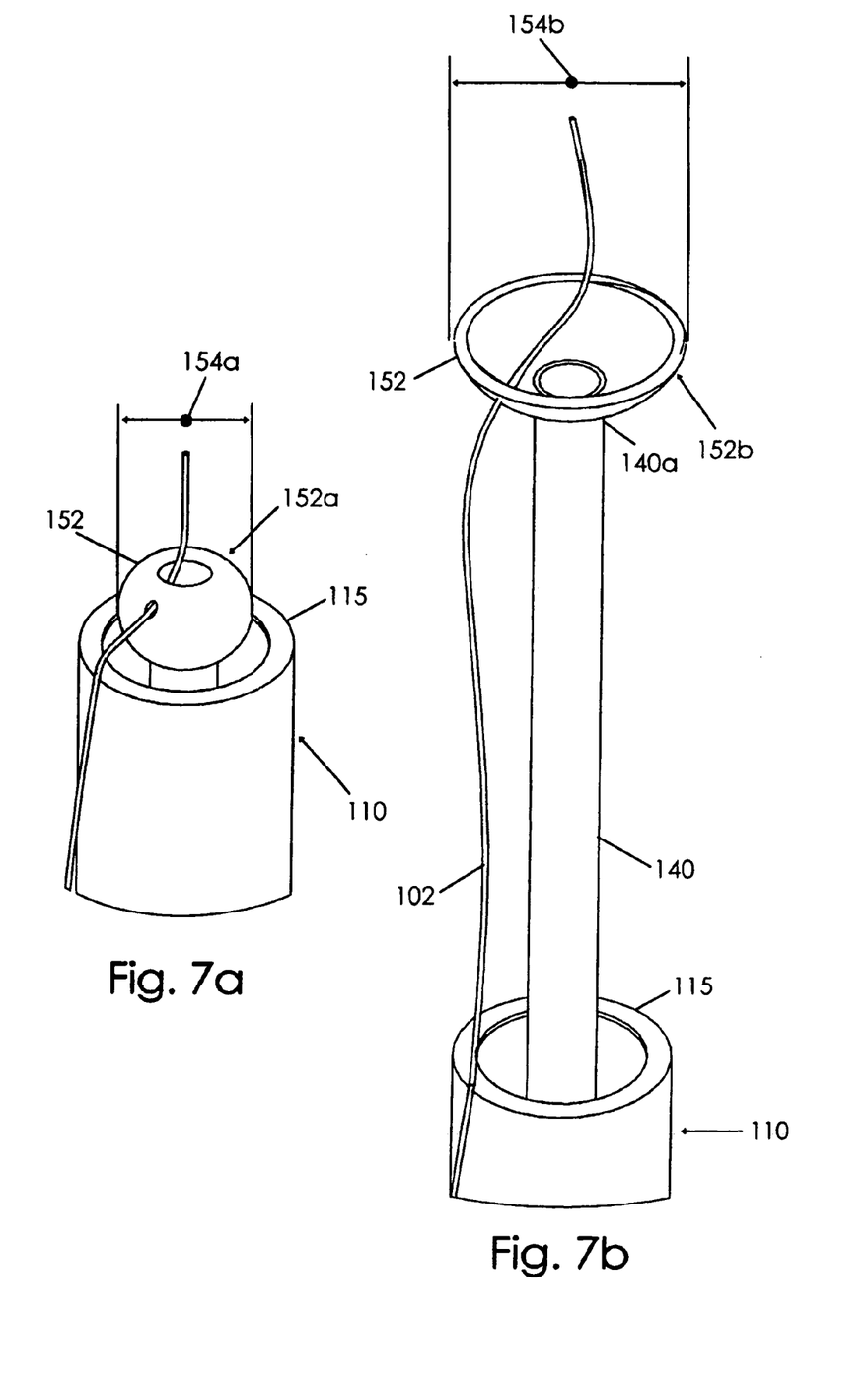
FIG. 7a is a perspective view on an enlarged scale as in FIG. 6a with a rod tip according to another aspect of the current invention.
FIG. 7b is a perspective view on an enlarged scale as in FIG. 6b with the rod tip according to another aspect of the current invention.
Figure 8A:
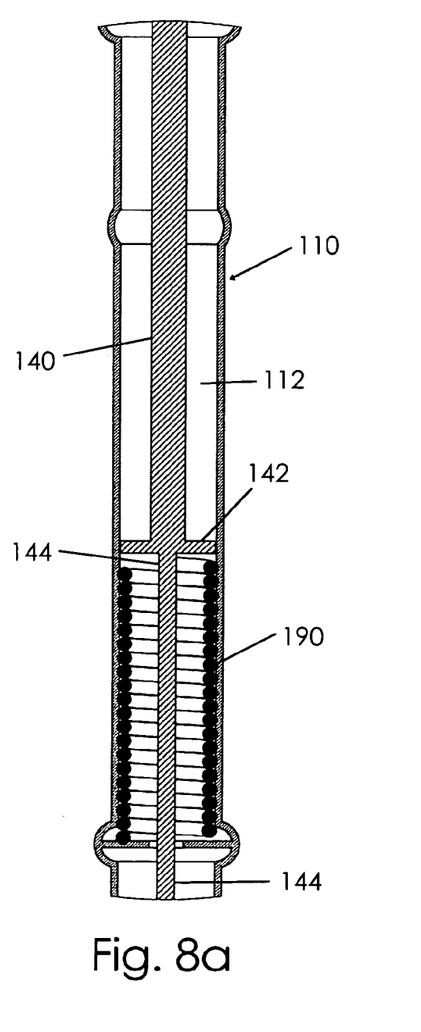
FIG. 8a is a sectional view on an enlarged scale taken from FIG. 1d when an energizing element is storing energy.
Figure 8B:
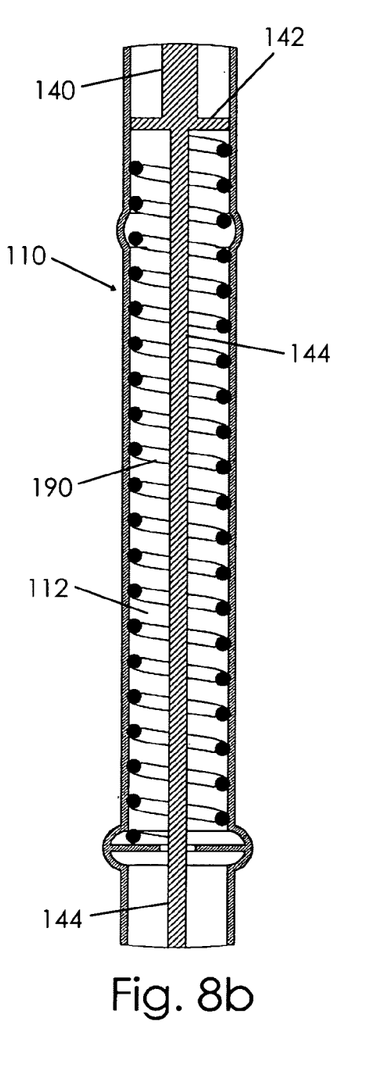
FIG. 8b is a sectional view on an enlarged scale as in FIG. 8a when the energizing element is not storing energy.

An elongate firing rod 140 is slidably mounted in the elongate shaft interior space 112 adjacent the elongate shaft second end 115 (FIGS. 6a through 8b). A tension member 144, such as a cord, preferably connects the cocking rod 130 and the firing rod 140 (FIGS. 4a and 8b). While the cocking rod 130 and the firing rod 140 may of course be attached differently, or indeed may be a single elongate rod, use of the tension member 144 is preferred to minimize weight and space attributes.

An energizing element 190 is positioned in the elongate shaft interior space 112 for selectively storing and releasing energy (FIGS. 8a and 8b). The cocking rod 130 is in communication with the energizing element 190 for selectively transferring energy to the energizing element 190 and for allowing the energizing element to selectively release the stored energy. While the energizing element 190 may be arranged in various manners to be in communication with the cocking rod 130, the cocking rod 130 is preferably in communication with the energizing element 190 via the firing rod 140. As such, the firing rod 140 preferably includes a flange 142 for engaging the energizing element 190 (FIGS. 8a and 8b). The energizing element 190 is preferably a spring, though other energy-storing devices such as a bungee cord or other elastic assembly may also be suitable.

Figures 4C, 4D:
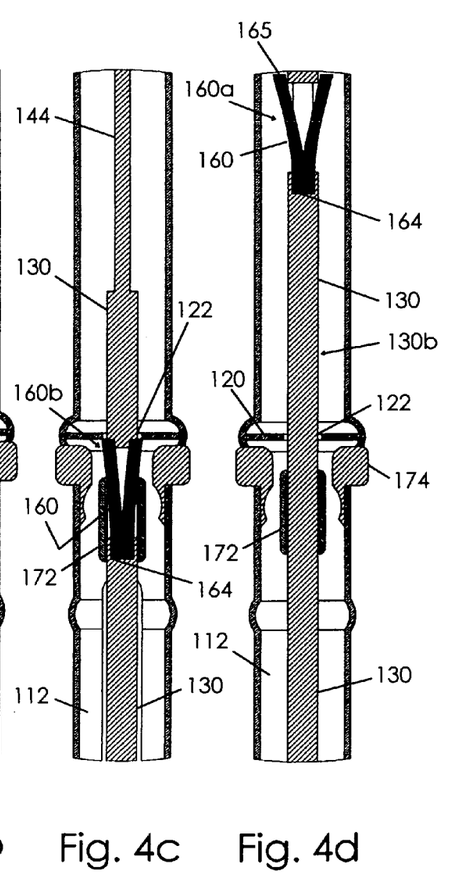
FIG. 4c is a sectional view on an enlarged scale as in FIG. 4b with the ball bushing moving further along the trigger and with the trigger at a second configuration.
FIG. 4d is a sectional view on an enlarged scale as in FIG. 4c with the trigger moved through a stop opening and the trigger at the first configuration.
Figure 5A:
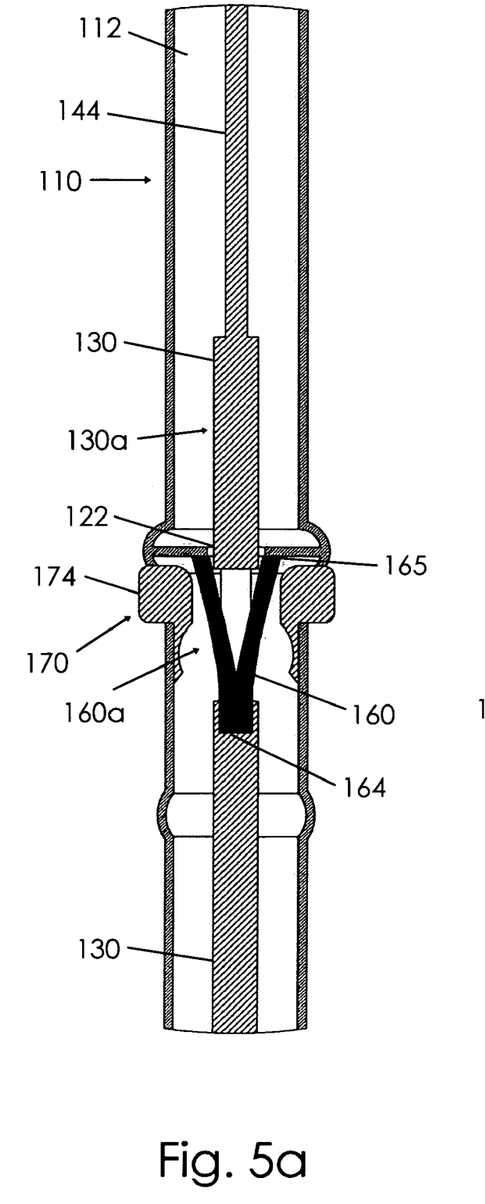
Figure 5B:
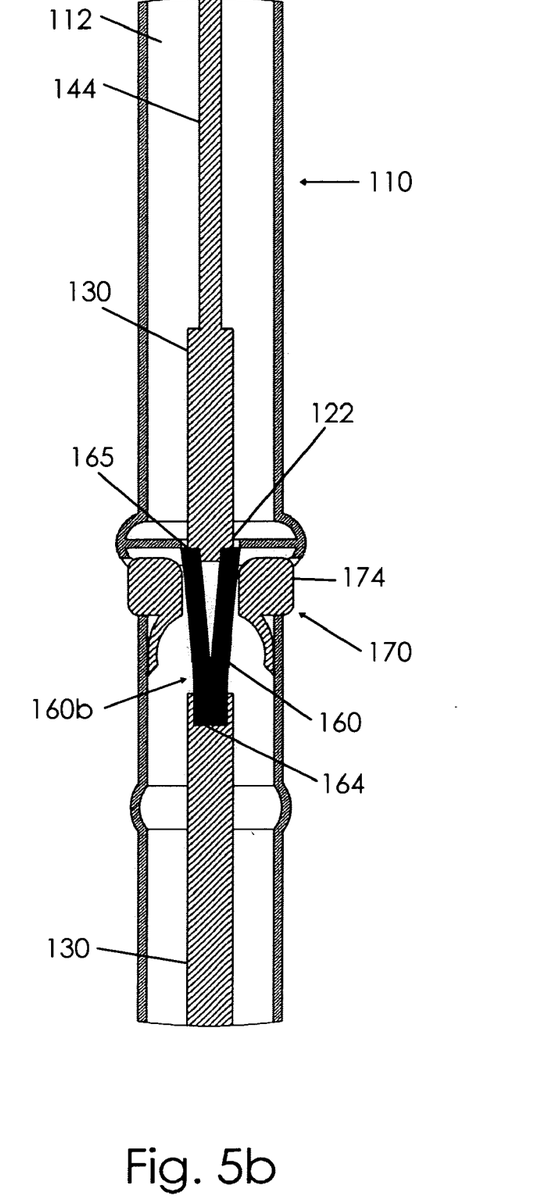
FIG. 5b is a sectional view on an enlarged scale as in FIG. 4b with a button moving the trigger to the second configuration.

A trigger 160 is attached to the cocking rod 130 and is selectively movable between a first configuration 160a that is immovable through the stop opening 122 (FIGS. 4a and 5a) and a second configuration 160b that is movable through the stop opening 122 (FIGS. 4c and 5b). The trigger 160 is biased toward the first configuration 160a. The trigger 160 preferably has first and second ends 164, 165 with the trigger second end 165 having a resilient construction and being forked. The trigger first end 164 has a diameter smaller than a diameter defined by the stop opening 122. The trigger second end 165 has a diameter larger than the diameter defined by the stop opening 122 when the trigger 160 is at the first configuration 160a (FIGS. 4a, 4d, and 5a), but the trigger second end 165 has a diameter smaller than the diameter defined by the stop opening 122 when the trigger 160 is at the second configuration 160b (FIGS. 4c and 5b).

A trigger release assembly 170 is proximate the trigger 160 for moving the trigger 160 from the first configuration 160a to the second configuration 160b (FIGS. 4a through 5b). The trigger release assembly 170 preferably includes a ball bushing 172 slidably coupled to the cocking rod 130 for selectively moving the trigger 160 from the first configuration 160a to the second configuration 160b when a casting motion is imparted to the elongate shaft 110. The trigger release assembly 170 also preferably includes a button 174 extending through the elongate shaft 110 for selectively exerting force on the trigger 160 to move the trigger 160 from the first configuration 160a to the second configuration 160b.

Figures 1A, 1B, 1C, 1D:
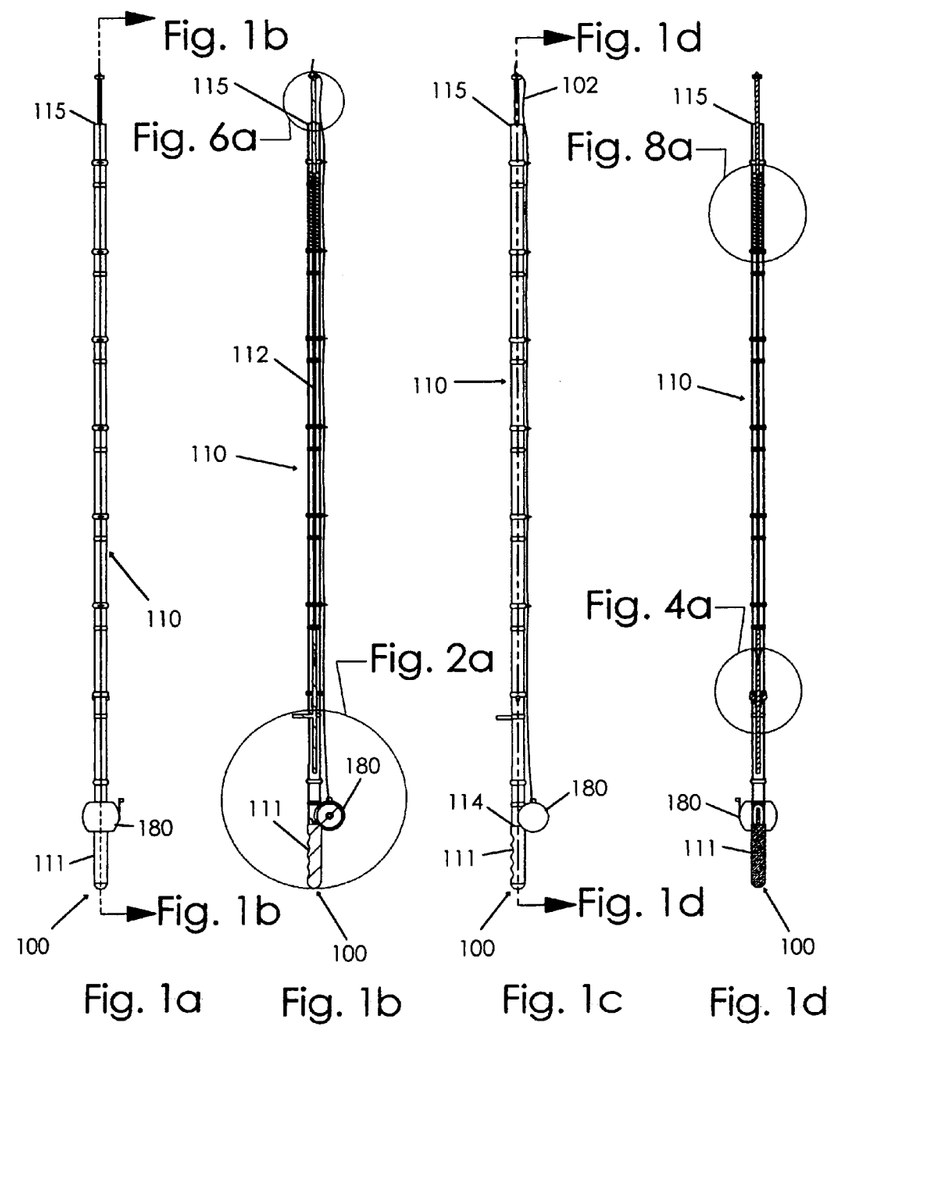
Figure 2A:
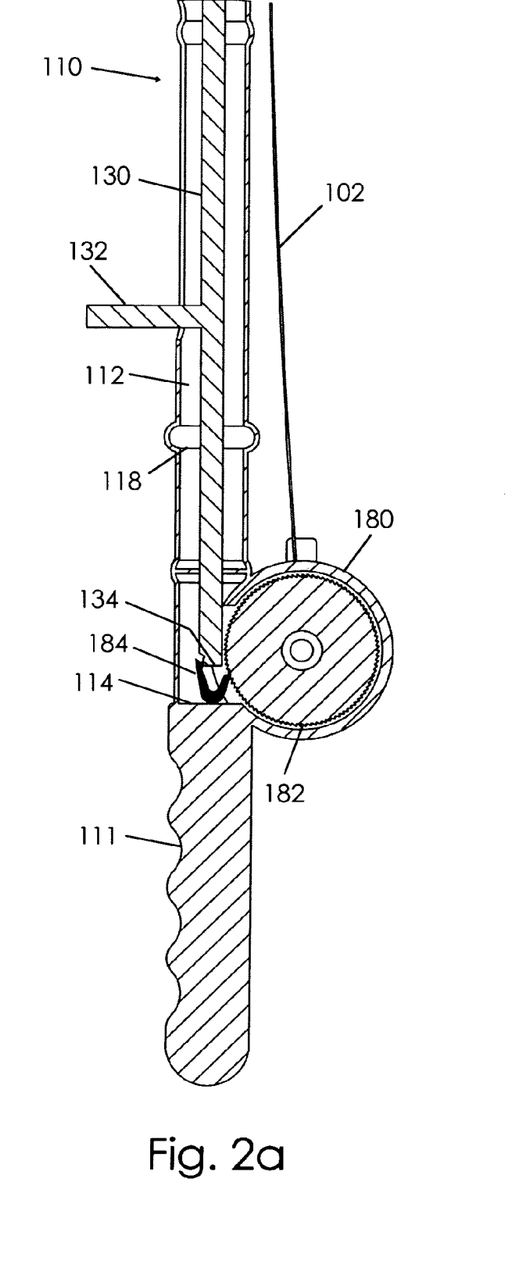
FIG. 2a is a sectional view on an enlarged scale taken from FIG. 1b with a cocking rod at a cocked configuration.
Figure 3:
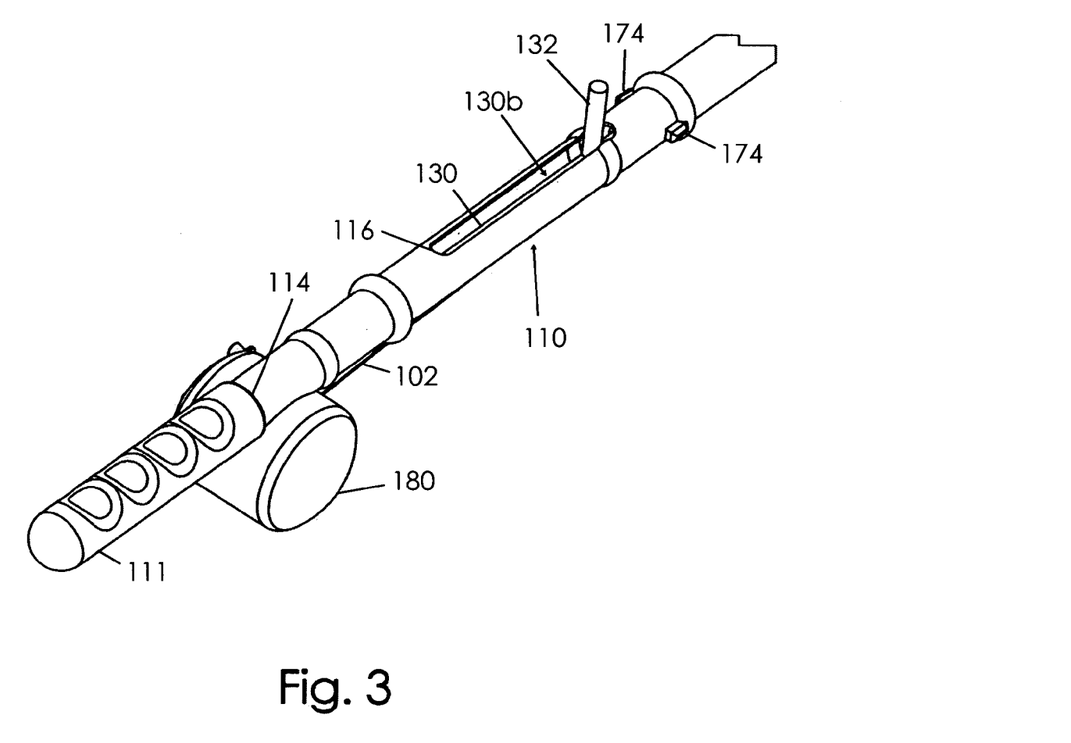
FIG. 3 is a partial perspective view of the fishing rod as in FIG. 2b.

The elongate shaft 110 defines an elongate opening 116 extending longitudinally therealong adjacent the elongate shaft first end 114 (FIG. 3), and an ergonomic handle 111 is adjacent the elongate shaft first end 114 (FIG. 3). A cocking handle 132 is connected to the cocking rod 130 and extends through the elongate opening 116 (FIG. 3), and at least one bearing 118 is preferably mounted in the elongate shaft interior space 112 for supporting the cocking rod 130 (FIG. 2a).

A rod tip 150 is adjacent the elongate shaft second end 115 for selectively retaining an item of fishing tackle 104 attached to a fishing line 102 (FIGS. 6a through 7b). The rod tip 150 is in communication with the energizing element 190, preferably by being attached to an end 140a of the firing rod 140. While the rod tip 150 may be a fixed cup (FIGS. 6a and 6b) or a traditional eyelet, it is preferably a hollow frustospherical member 152 for moving between a concave configuration 152a (FIG. 7a) corresponding to the trigger first configuration 160a and a convex configuration 152b (FIG. 7b) corresponding to the trigger second configuration 160b. The hollow frustospherical member 152 is constructed of a resilient plastic material for biasing the hollow frustospherical member 152 toward the convex configuration 152b, and the hollow frustospherical member 152 has a convex diameter 154b larger than a diameter 112a of the elongate shaft interior space 112. The hollow frustospherical member 152 has a concave diameter 154a smaller than the elongate shaft interior space diameter 112a.

Figure 2B:
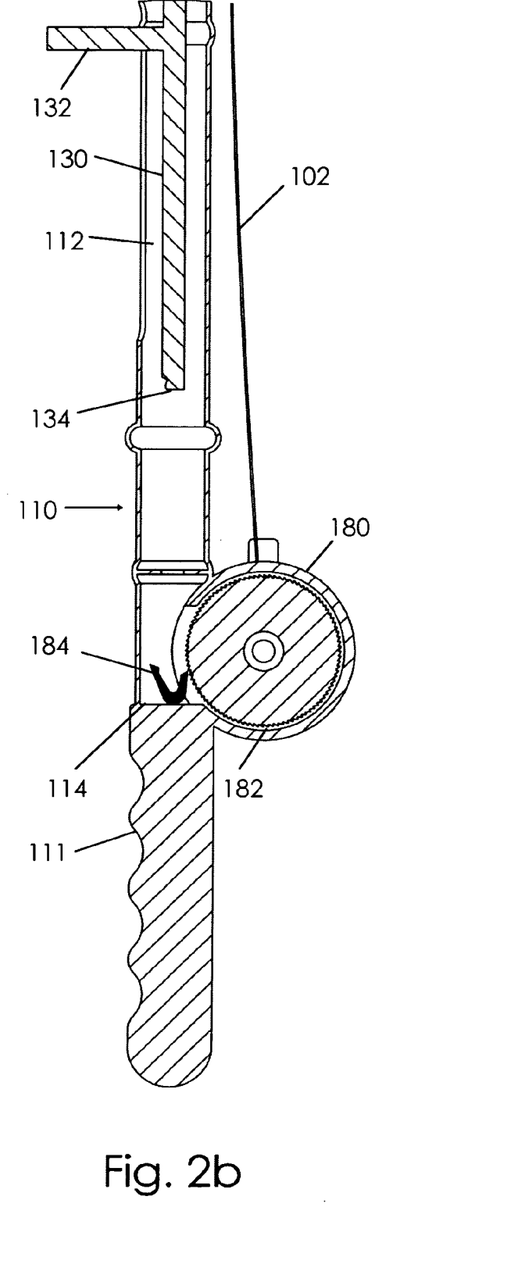
FIG. 2b is a sectional view on an enlarged scale as in FIG. 2a with the cocking rod at a released configuration.

A reel 180 is mounted to the elongate shaft 110 adjacent the first end 114 for anchoring the fishing line 102 and includes a ratchet release mechanism 182 (FIGS. 2a and 2b). A pawl 184 has a configuration complimentary to a configuration of a first end 134 of the cocking rod 130 and a configuration complimentary to a configuration of the ratchet release mechanism 182. The pawl 184 is positioned to engage the ratchet release mechanism 182 when the cocking rod 130 is at a cocked configuration 130a and for automatically disengaging the ratchet release mechanism 182 when the cocking rod 130 is at a released configuration 130b.

In use, the fishing line 102 is anchored to the reel 180 and strung to the rod tip 150. An item of fishing tackle 104 is then attached to the fishing line (FIGS. 6b and 7b). Initially, the cocking rod 130 is at the released configuration 130b (FIGS. 2b and 3), the trigger 160 is at the first configuration 160a (FIG. 4d), the firing rod 140 is extended outwardly (FIGS. 6b and 7b), and the energizing element 190 is not storing energy (FIG. 8b). A user holds the ergonomic handle 111 with one hand and grabs the cocking handle 132 with his other hand. By pulling on the cocking handle 132, the user moves the cocking rod 130 to the cocked configuration 130a (FIG. 2a).

During this transition, the trigger 160 is temporarily constricted by the stop 120 to allow the trigger 160 to pass through the stop opening 122. As the cocking rod 130 is moving to the cocked configuration 130a, the tension member 144 causes the firing rod 140 to recede into the elongate shaft interior space 112 (FIGS. 6a and 7a). As the firing rod 140 recedes into the elongate shaft interior space 112, the flange 142 engages and transfers energy to the energizing element 190, e.g. compresses the spring. If the hollow frustospherical member 152 is included, it moves from the convex configuration 152b to the concave configuration 152a because the convex diameter 154b is too large to fit in the elongate shaft interior space 112. When the hollow frustospherical member 152 moves to the concave configuration 152a, it may enclose the item of fishing tackle 104 (FIG. 7a).

When the cocking rod 130 is in the cocked configuration 130a, the trigger 160 is again in the first configuration 160a (FIG. 4a) and the cocking rod first end 134 engages the pawl 184 (FIG. 2a). The pawl 184 then engages the ratchet release mechanism 182, effectively locking the position of the fishing line 102. The energizing element 190 stores the energy transferred thereto as described above (FIG. 8a). This stored energy may then be used to cast the fishing line 102 upon the movement of the trigger 160 from the first configuration 160a to the second configuration 160b.

The trigger 160 may be forced to change configurations in two ways. First, the button 174 may be pressed to force the trigger 160 to move to the second configuration 160b (FIG. 5b). Second, the elongate shaft 110 may be swung in a traditional casting motion. This motion causes the ball bushing 172 to slidably engage the trigger 160 until the trigger 160 is constricted enough to pass through the stop opening 122 (FIGS. 4a through 4d).

When the trigger 160 is in the second configuration 160b and capable of passing through the stop opening 122 (FIGS. 4c and 5b), the energizing element 190 releases the stored energy, i.e. allows the spring to release. This energy pushes the flange 142 on the firing rod 140, causing the firing rod 140 to extend outwardly (FIGS. 6b and 7b). As the firing rod 140 extends outwardly, the attached tension member 144 is pulled, causing the trigger 160 to pass through the stop opening 122 and the cocking rod 130 to move to the released configuration 130b. When the cocking rod 130 moves from the cocked configuration 130a, the cocking rod first end 134 releases the pawl 184 (FIG. 2b). The pawl 184 in turn releases the ratchet release mechanism 182, allowing the fishing line 102 to be cast.

As the firing rod 140 extends outwardly, the hollow frustospherical member 152 moves to the convex configuration 152b (FIG. 7b) since there is no longer an interaction with the elongate shaft 110 forcing the hollow frustospherical member 152 to the concave configuration 152a. The momentum of the rod tip 150 causes the fishing line 102 and the item of fishing tackle 104 to be cast (FIG. 7b). After the trigger 160 passes through the stop opening 122, the trigger 160 returns to the first configuration 160a due to its resilient nature (FIG. 4d).

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A fishing rod, comprising:
   an elongate shaft defining an interior space and having opposed first and second ends;
   an energizing element positioned in said elongate shaft interior space for selectively storing and releasing energy;
   a stop mounted in said elongate shaft interior space and defining a stop opening;
   a cocking rod slidably mounted in said elongate shaft interior space for relative movement through said stop opening, said cocking rod being in communication with said energizing element for selectively transferring energy to said energizing element and for allowing said energizing element to selectively release said stored energy;
   a trigger attached to said cocking rod and being selectively movable between a first configuration immovable through said stop opening and a second configuration movable through said stop opening, said trigger being biased toward said first configuration;
   a rod tip adjacent said elongate shaft second end for selectively retaining an item of fishing tackle attached to a fishing line, said rod tip being in communication with said energizing element;
   a trigger release assembly proximate said trigger for moving said trigger from said first configuration to said second configuration, said energizing element releasing said energy stored therein when said trigger moves from said first configuration to said second configuration for imparting a force on said rod tip for automatically casting said item of fishing tackle;
   wherein said elongate shaft defines an elongate opening extending longitudinally therealong adjacent said elongate shaft first end; and
   wherein said fishing rod further comprises a cocking handle connected to said cocking rod and extending through said elongate opening defined by said elongate shaft for manually moving said cocking rod to a cocked configuration, whereby transferring energy to said energizing element for storage in said energizing element.

2. The fishing rod as in claim 1, wherein:
   said trigger has first and second ends with said trigger second end having a resilient construction;
   said trigger first end has a diameter smaller than a diameter defined by said stop opening;
   said trigger second end has a diameter larger than said stop opening diameter when said trigger is at said first configuration;
   said trigger second end has a diameter smaller than said stop opening diameter when said trigger is at said second configuration; and
   said trigger second end is biased toward said first configuration.

3. The fishing rod as in claim 2, wherein said trigger second end is forked.

4. The fishing rod as in claim 1, wherein said energizing clement is a spring.

5. The fishing rod as in claim 1, wherein said trigger release assembly includes a ball bushing slidably coupled to said cocking rod for selectively moving said trigger from said first configuration to said second configuration when a casting motion is imparted to said elongate shaft.

6. The fishing rod as in claim 1, wherein said trigger release assembly includes a button extending through said elongate shaft for selectively exerting force on said trigger, whereby to move said trigger from said first configuration to said second configuration.

7. The fishing rod as in claim 1, wherein said trigger release assembly comprises:
   a ball bushing slidably coupled to said cocking rod for selectively moving said trigger from said first configuration to said second configuration when a casting motion is imparted to said elongate shaft; and
   a button extending through said elongate shaft for selectively exerting force on said trigger, whereby to move said trigger from said first configuration to said second configuration.

8. The fishing rod as in claim 1, ftarther comprising an elongate firing rod slidably mounted in said elongate shaft interior space adjacent said elongate shaft second end, said firing rod being in communication with said energizing element and said cocking rod.

9. The fishing rod as in claim 8, further comprising a tension member connecting said cocking rod and said firing rod.

10. The fishing rod as in claim 1, further comprising:
    a reel mounted to said elongate shaft adjacent said first end thereof for anchoring said fishing line, said reel including a ratchet release mechanism; and
    a pawl having a configuration complimentary to a configuration of a first end of said cocking rod and a configuration complimentary to a configuration of said ratchet release mechanism for engaging said ratchet release mechanism when said cocking rod is at a cocked configuration and for automatically disengaging said ratchet release mechanism when said cocking rod is at a released configuration.

11. The fishing rod as in claim 1, further including a bearing mounted in said elongate shaft interior space for supporting said cocking rod.

12. The fishing rod as in claim 1, further comprising a handle adjacent said elongate shaft first end and having an ergonomic configuration.

13. A fishing rod, comprising:
- an elongate shaft defining an interior space and having opposed first and second ends;
- an energizing element positioned in said elongate shaft interior space for storing and releasing energy;
- a stop mounted in said elongate shaft interior space and defining a stop opening;
- a cocking rod slidably mounted in said elongate shaft interior space, said cocking rod being positioned to selectively travel through said stop opening, said cocking rod being in communication with said energizing element for selectively transferring energy to said energizing element and for allowing said energizing element to selectively release said stored energy;
- a trigger attached to said cocking rod and being selectively movable between a first configuration immovable through said stop opening and a second configuration movable through said stop opening, said trigger being biased toward said first configuration;
- an elongate firing rod slidably mounted in said elongate shalt interior space adjacent said elongate shaft second end, said firing rod being in communication with said cocking rod and said energizing element;
- a rod tip attached to an end of said firing rod for selectively retaining an item of fishing tackle attached to a fishing line;
- a trigger release assembly proximate said trigger for selectively moving said trigger from said first configuration to said second configuration, said energizing element releasing said energy stored therein when said trigger moves from said first configuration to said second configuration for causing said firing rod to impart a force on said rod tip for automatically casting said item of fishing tackle; and
- wherein said trigger release assembly includes a bail bushing slidably coupled to said cocking rod for selectively moving said trigger from said first configuration to said second configuration when a casting motion is imparted to said elongate shaft.

14. The fishing rod as in claim 13, wherein said trigger release assembly includes a button extending through said elongate shaft for selectively exerting force on said trigger, whereby to move said trigger from said first configuration to said second configuration.

15. The fishing rod as in claim 13, wherein said trigger release assembly comprises:
- a ball bushing slidably coupled to said cocking rod for selectively moving said trigger from said first configuration to said second configuration when a casting motion is imparted to said elongate shaft; and
- a button extending through said elongate shaft for selectively exerting force on said trigger, whereby to move said trigger from said first configuration to said second configuration.

* * * * *